(12) United States Patent  (10) Patent No.: US 7,585,072 B1
Wang-Lee  (45) Date of Patent: Sep. 8, 2009

(54) NOSE PAD FOR EYEGLASSES

(75) Inventor: Tzu-Feng Wang-Lee, Rende Township, Tainan County (TW)

(73) Assignee: Jiann Lih Optical Co., Ltd., Tainan County (TW)

( * ) Notice: Subject to any disclaimer, the term of this patent is extended or adjusted under 35 U.S.C. 154(b) by 0 days.

(21) Appl. No.: 12/259,337

(22) Filed: Oct. 28, 2008

(30) Foreign Application Priority Data

Sep. 5, 2008 (TW) ............................. 97216037 U

(51) Int. Cl.
G02C 5/12 (2006.01)
(52) U.S. Cl. ...................................... 351/138; 351/136
(58) Field of Classification Search ................ 351/138, 351/136, 137, 139, 41, 65, 78, 80, 83, 86, 351/110, 124, 131, 132
See application file for complete search history.

(56) References Cited

U.S. PATENT DOCUMENTS

| 4,405,214 | A | * | 9/1983 | Bolle | 351/88 |
| 4,951,322 | A | * | 8/1990 | Lin | 2/439 |
| 5,032,017 | A | * | 7/1991 | Bolle et al. | 351/116 |
| 6,568,806 | B1 | * | 5/2003 | Lin | 351/138 |
| 6,908,193 | B2 | * | 6/2005 | Cyr | 351/103 |
| 7,347,545 | B1 | * | 3/2008 | Jannard et al. | 351/106 |
| 7,431,451 | B1 | * | 10/2008 | Lin | 351/138 |
| 7,484,843 | B1 | * | 2/2009 | Lin | 351/80 |

* cited by examiner

*Primary Examiner*—Hung X Dang
(74) *Attorney, Agent, or Firm*—Alan Kamrath; Kamrath & Associates PA

(57) ABSTRACT

An improved structure of a nose pad for eyeglasses is provided. The nose pad, installed at a middle section of an eyeglass frame, has an upper section extended with an engaging portion inwardly formed with a recess for snap-fitting on a protuberance formed on a bridge at the middle section of the eyeglass frame. The engaging portion is outwardly formed with a protruding area for inserting into a hole of a fastener so that a hook portion extending inwardly from an upper section of the fastener can engage with an inner surface of the bridge while two jutting portions extending from a lower section of the fastener can insert into grooves of the nose pad. Additionally, two pad portions of the nose pad can couple with projections on an inner surface of the eyeglass frame. Thus, the nose pad can be positioned properly with respect to the eyeglass frame.

1 Claim, 4 Drawing Sheets

NOSE PAD FOR EYEGLASSES

BACKGROUND OF THE INVENTION

1. Technical Field

The present invention relates to nose pads for eyeglasses. More particularly, the present invention relates to an improved structure of a nose pad for eyeglasses, wherein the nose pad, installed at a middle section of an eyeglass frame, is attached to an outer surface of a bridge of the eyeglass frame and secured at a predetermined location on the eyeglass frame by a fastener.

2. Description of Related Art

Generally, a pair of eyeglasses includes an eyeglass frame, lenses coupled therewith, and temples bilaterally and pivotally provided on the eyeglass frame. The eyeglass frame has a central portion extended bilaterally with projections to allow assembly with two separately formed nose pads. These nose pads, though properly positioned when first installed on the eyeglass frame, tend to get loose with respect to the corresponding projections of the eyeglass frame after a period of time so that the nose pads may eventually fall off from the eyeglass frame.

BRIEF SUMMARY OF THE INVENTION

In view of the aforesaid drawback of the conventional nose pads installed on an eyeglass frame, particularly in terms of how the nose pads are secured in place, the present invention provides an improvement in which a nose pad is installed by being attached to an outer surface of a bridge of an eyeglass frame and by being secured at a predetermined location on the eyeglass frame by a fastener, so that it is ensured that the nose pad is properly and stably positioned with respect to the eyeglass frame.

A primary objective of the present invention is to provide an improved structure of a nose pad for an eyeglass, wherein the nose pad, installed at a middle section of an eyeglass frame, is integrally formed and has an upper section extended with an engaging portion inwardly formed with a recess for snap-fitting on a protuberance formed on a bridge at the middle section of the eyeglass frame. In addition, the engaging portion of the nose pad is outwardly formed with a protruding area for inserting into a through hole which is provided on a fastener and corresponds in position to the protruding area, so that a hook portion extending inwardly from an upper section of the fastener can engage with an inner surface of the bridge of the eyeglass frame while two jutting portions extending outwardly from a lower section of the fastener can be inserted into grooves which are formed on the nose pad and correspond in position to the jutting portions. Besides, the nose pad is provided with two pad portions to be coupled with projections formed on an inner surface of the eyeglass frame. Thus, the nose pad is retained by the fastener and positioned properly and stably with respect to the eyeglass frame.

BRIEF DESCRIPTION OF THE SEVERAL VIEWS OF THE DRAWINGS

The invention as well as a preferred mode of use, further objectives and advantages thereof will be best understood by referring to the following detailed description of an illustrative embodiment in conjunction with the accompanying drawings, wherein.

DETAILED DESCRIPTION OF THE INVENTION

Figure 1:
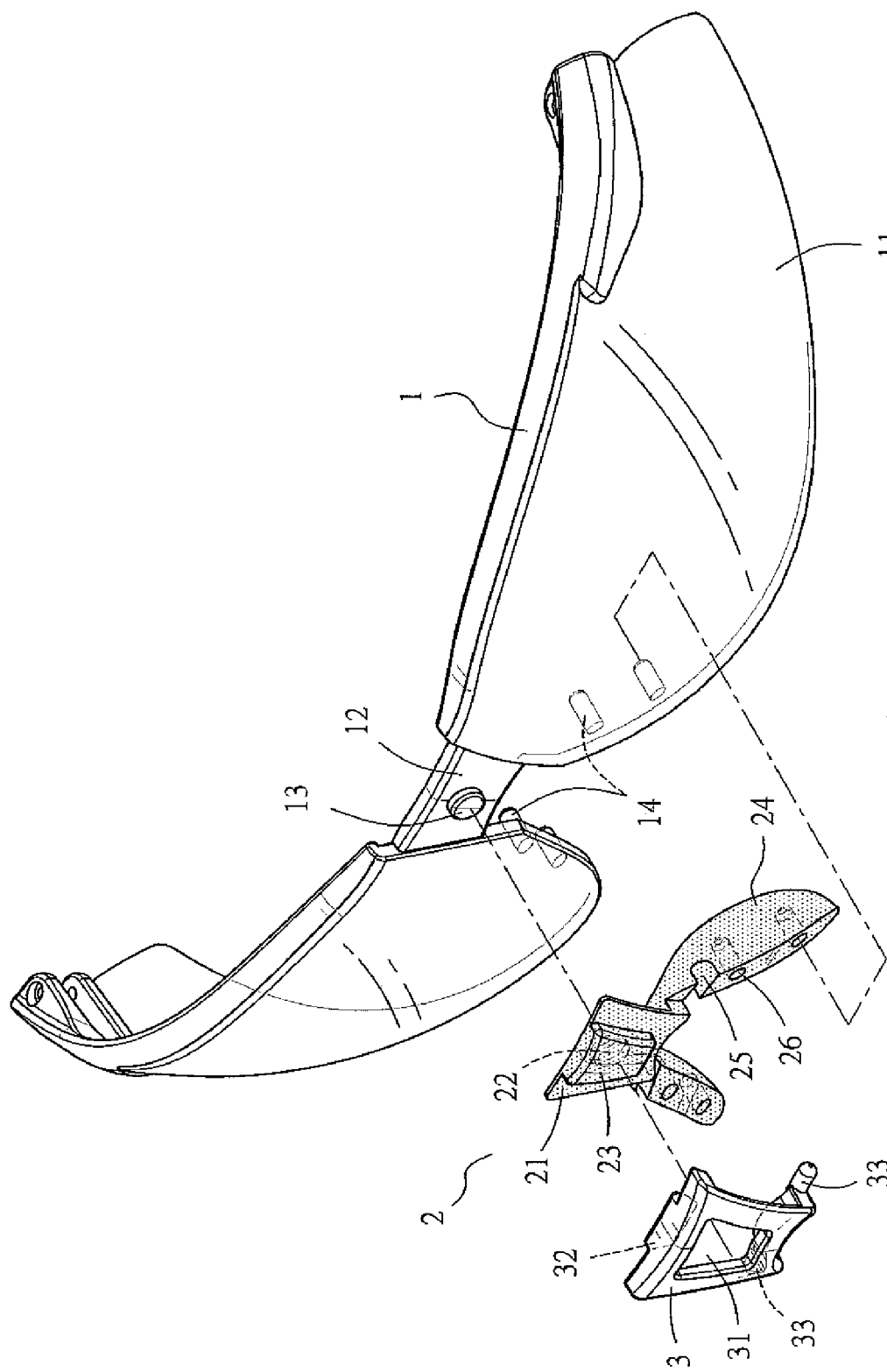
FIG. 1 is an exploded perspective view of eyeglasses including an eyeglass frame and a nose pad according to the present invention.

Referring to FIG. 1, the present invention provides an improved structure of a nose pad for eyeglasses. As shown in the drawing, a nose pad 2 is installed at a middle section of an eyeglass frame 1 coupled with lenses 11 and is secured in place by a fastener 3.

The eyeglass frame 1 is bilaterally and integrally formed with the lenses 11. The middle section of the eyeglass frame 1 is provided with a bridge 12, which has an outer surface formed with a protuberance 13. The eyeglass frame 1 also has an inner surface bilaterally formed with projections 14.

The nose pad 2, integrally formed of a soft and resilient material, has an upper section extended with an engaging portion 21. The engaging portion 21 is inwardly formed with a recess 22 and outwardly formed with a protruding area 23. In addition, the nose pad 2 has a lower section extended with two pad portions 24, and an outer surface formed with grooves 25. Each of the two pad portions 24 has a flat surface formed with cavities 26.

Figure 3:
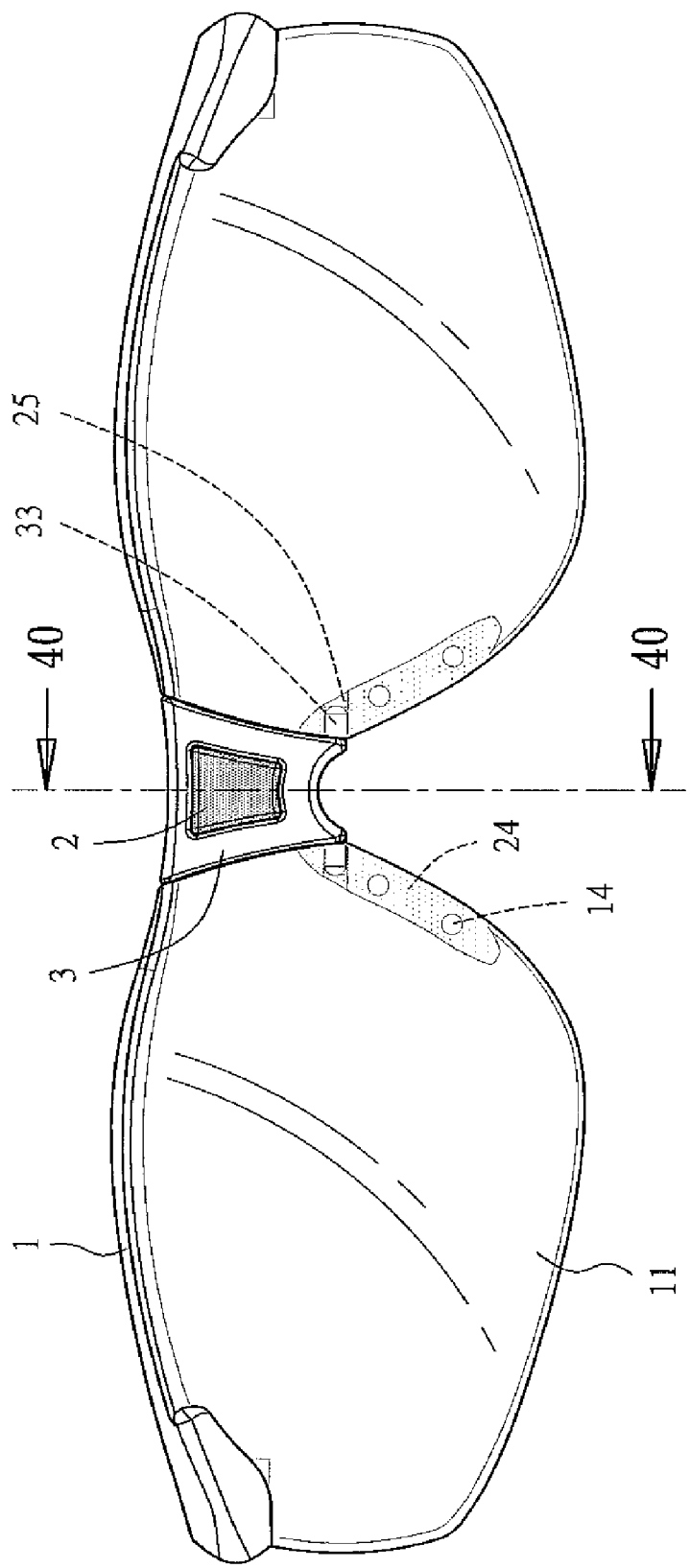
FIG. 3 is a front view of the eyeglasses including the eyeglass frame and the nose pad according to the present invention.
Figure 4:
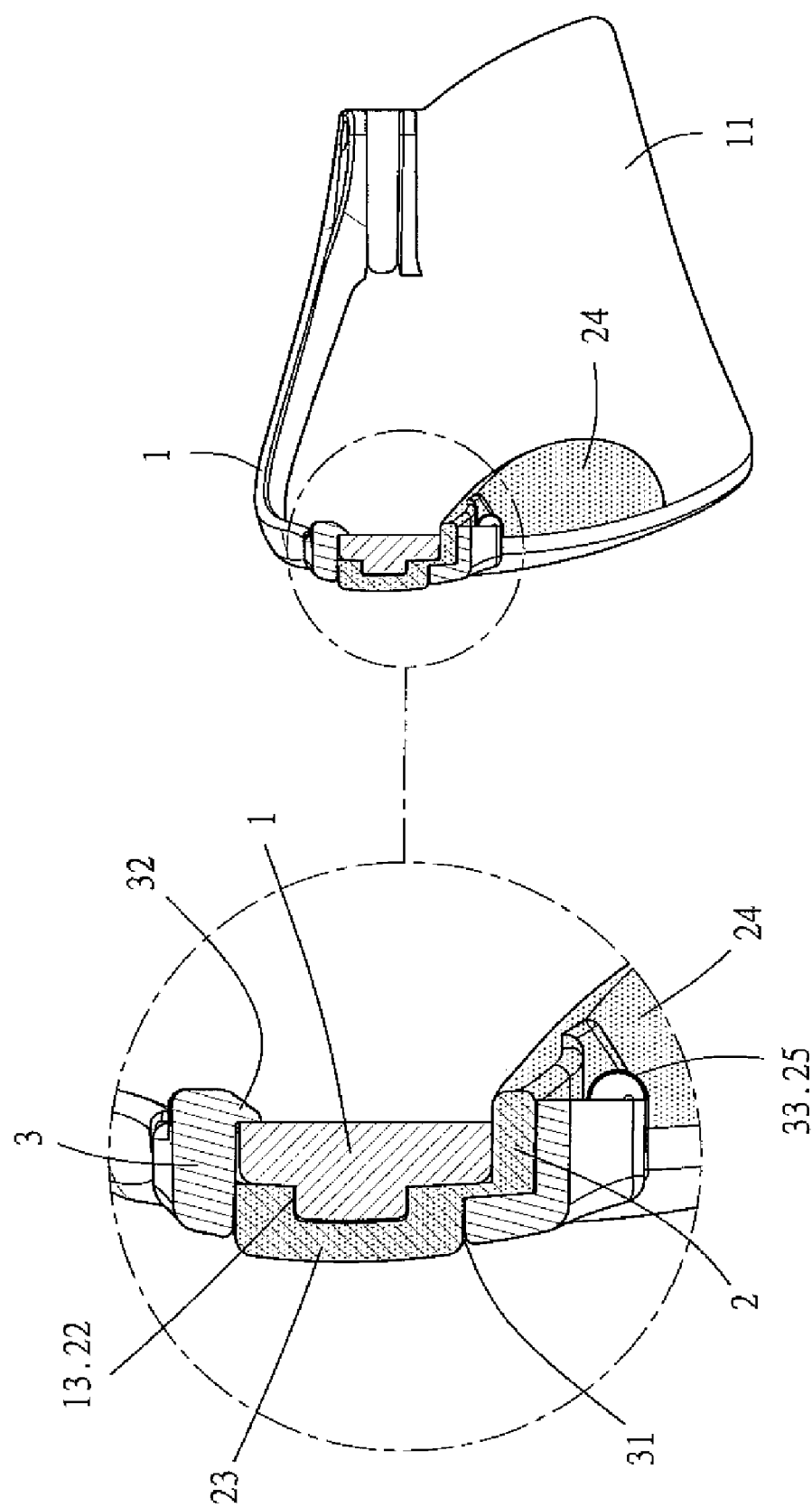
FIG. 4 is a sectional view taken along a line 40-40 in FIG. 3.

The fastener 3 is shaped and sized according to the engaging portion 21 at the upper section of the nose pad 2. The fastener 3 is centrally formed with a through hole 31 and has an upper section formed with an inwardly extending hook portion 32, as can be seen in FIGS. 3 and 4. Besides, two jutting portions 33 extend outwardly from a lower section of the fastener 3.

Figure 2:
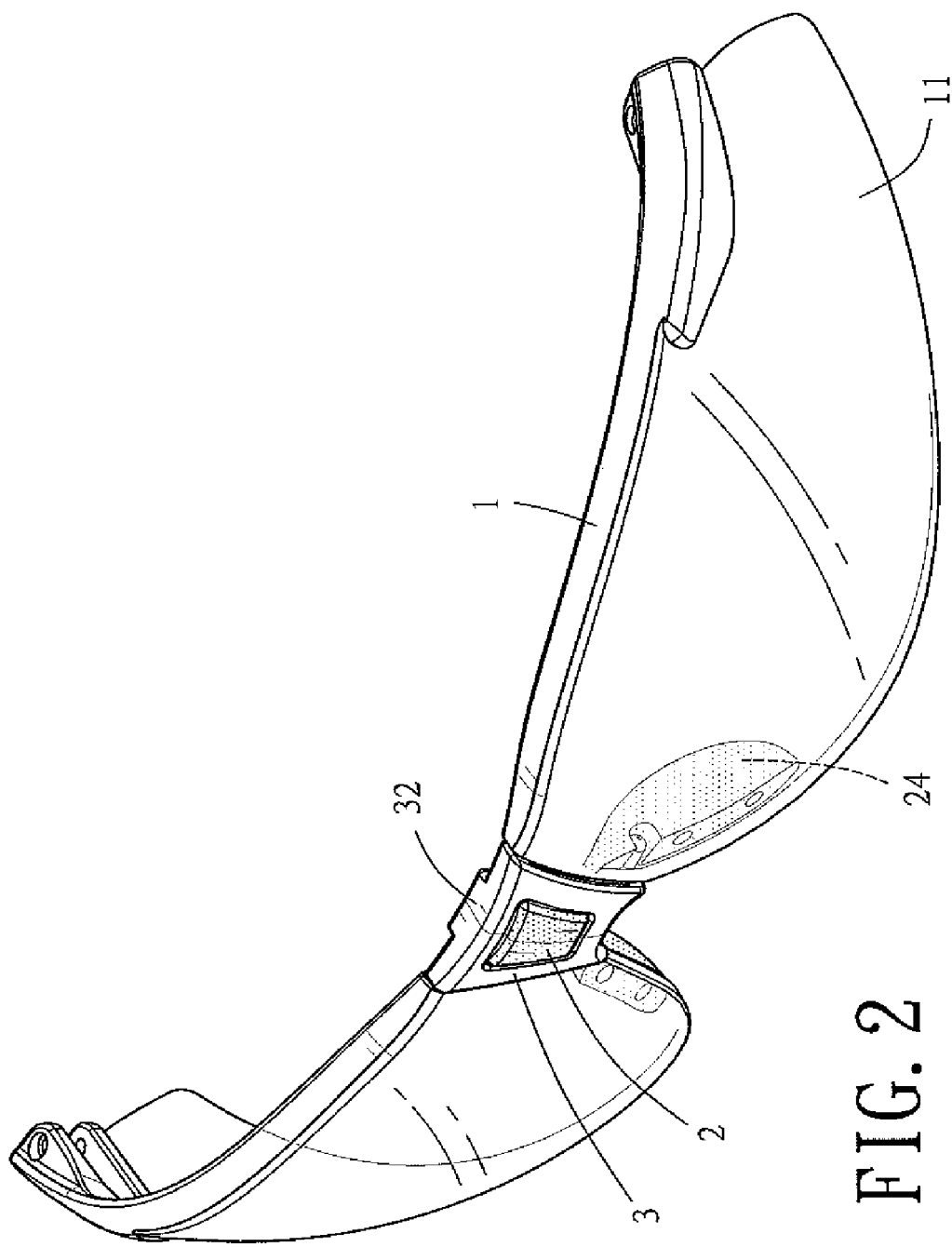
FIG. 2 is a perspective view of the eyeglasses in FIG. 1, showing the eyeglass frame and the nose pad according to the present invention in an assembled state.

Referring to FIGS. 1, 3 and 4, in order to install the nose pad 2 and the fastener 3 onto the eyeglass frame 1, the recess 22 inwardly formed on the engaging portion 21 at the upper section of the nose pad 2 is snap-fitted on the protuberance 13 formed on the bridge 12 at the middle section of the eyeglass frame 1. Then, the through hole 31 of the fastener 3 is aligned with and inserted by the protruding area 23 outwardly formed on the engaging portion 21, so that the hook portion 32 extending inwardly from the upper section of the fastener 3 is engaged with an inner surface of the bridge 12 of the eyeglass frame 1 while the two jutting portions 33 extending outwardly from the lower section of the fastener 3 are fitted tightly into the grooves 25 which are formed on the nose pad 2 and correspond in position to the jutting portions 33. Next, the two pad portions 24 extending from the lower section of the nose pad 2 are pushed inward to an inner side of the eyeglass frame 1, thereby allowing the cavities 26 of the two pad portions 24 to be coupled with the projections 14 on the inner surface of the eyeglass frame 1. Thus, the nose pad 2 is retained in place by the fastener 3 and positioned properly and stably with respect to the eyeglass frame 1, as shown in FIG. 2.

The invention claimed is:

1. A structure of a nose pad for eyeglasses, wherein the nose pad is installed at a middle section of an eyeglass frame of the eyeglasses coupled with lenses, the structure of the nose pad being characterized in that:

the nose pad is integrally formed and has an upper section extended with an engaging portion inwardly formed with a recess for snap-fitting on a protuberance formed on a bridge at the middle section of the eyeglass frame, wherein the engaging portion of the nose pad is outwardly formed with a protruding area for inserting into a through hole which is provided on a fastener and corresponds in position to the protruding area so that a hook portion extending inwardly from an upper section of the fastener can be engaged with an inner surface of the bridge of the eyeglass frame while two jutting portions extending outwardly from a lower portion of the fastener can be fitted tightly into grooves which are formed on the nose pad and correspond in position to the jutting portions, in which the nose pad further has a lower section provided with two pad portions which can be coupled with projections formed on an inner surface of the eyeglass frame so that the nose pad is retained by the fastener and positioned properly and stably with respect to the eyeglass frame.

* * * * *